(12) United States Patent
Huang et al.

(10) Patent No.: US 11,064,045 B2
(45) Date of Patent: Jul. 13, 2021

(54) METHOD AND SYSTEM FOR PROCESSING SERVICE FUNCTION CHAIN REQUEST

(71) Applicant: Beijing Univerisity of Posts and Telecommunications, Beijing (CN)

(72) Inventors: Shanguo Huang, Beijing (CN); Xin Li, Beijing (CN); Tao Gao, Beijing (CN); Ying Tang, Beijing (CN); Yongjun Zhang, Beijing (CN); Bingli Guo, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 160 days.

(21) Appl. No.: 16/672,050

(22) Filed: Nov. 1, 2019

(65) Prior Publication Data
US 2021/0029218 A1 Jan. 28, 2021

(30) Foreign Application Priority Data
Jul. 26, 2019 (CN) .......................... 201910684427.0

(51) Int. Cl.
*H04L 29/08* (2006.01)
*H04J 14/02* (2006.01)
*H04L 12/24* (2006.01)
*H04L 12/26* (2006.01)

(52) U.S. Cl.
CPC .......... *H04L 67/32* (2013.01); *H04J 14/0212* (2013.01); *H04L 41/5003* (2013.01); *H04L 43/0852* (2013.01); *H04L 67/10* (2013.01)

(58) Field of Classification Search
CPC . H04L 67/32; H04L 41/5003; H04L 43/0852; H04L 67/10; H04J 14/0212
See application file for complete search history.

(56) References Cited

U.S. PATENT DOCUMENTS

| | | | |
|---|---|---|---|
| 2018/0041905 A1* | 2/2018 | Ashrafi | H04W 48/18 |
| 2018/0063731 A1* | 3/2018 | Ashrafi | H04B 10/1123 |
| 2018/0077024 A1* | 3/2018 | Zhang | H04L 63/0272 |
| 2018/0088972 A1* | 3/2018 | Kubota | G06F 9/45558 |
| 2018/0091420 A1* | 3/2018 | Drake | H04L 45/38 |
| 2018/0205637 A1* | 7/2018 | Li | H04L 41/5058 |
| 2018/0227243 A1* | 8/2018 | Zhang | H04L 41/12 |
| 2018/0262431 A1* | 9/2018 | Zhang | H04L 47/125 |
| 2018/0316615 A1* | 11/2018 | Shaw | H04L 41/0806 |
| 2018/0316779 A1* | 11/2018 | Dowlatkhah | H04W 24/02 |
| 2018/0343567 A1* | 11/2018 | Ashrafi | H04L 67/10 |
| 2018/0351652 A1* | 12/2018 | Ashrafi | H04L 41/08 |
| 2018/0351824 A1* | 12/2018 | Giust | H04W 36/0022 |
| 2018/0376338 A1* | 12/2018 | Ashrafi | H04W 16/10 |

(Continued)

*Primary Examiner* — Mina M Shalaby
(74) *Attorney, Agent, or Firm* — Westbridge IP LLC

(57) ABSTRACT

Disclosed is a method for processing a service function chain request, which includes: classifying the service function chain request received; determining a domain to process the service function chain request; wherein the service function chain requested by the service function chain request includes at least one virtual network function (VNF); distributing the service function chain request to the domain determined; determining at least one server for implementing the at least one VNF; and determining the time at which the at least one server implements the at least one VNF. The disclosure also discloses a system for processing a service function chain request.

19 Claims, 7 Drawing Sheets

(56) References Cited

U.S. PATENT DOCUMENTS

| | | | |
|---|---|---|---|
| 2019/0069187 A1* | 2/2019 | Ashrafi | H04W 72/0406 |
| 2019/0260647 A1* | 8/2019 | Ishida | H04L 41/145 |
| 2019/0268384 A1* | 8/2019 | Hu | H04L 63/20 |
| 2020/0007413 A1* | 1/2020 | Kerpez | H04L 41/5019 |
| 2020/0195553 A1* | 6/2020 | Yigit | H04L 43/0805 |
| 2020/0314121 A1* | 10/2020 | Mittermaier | H04L 67/10 |
| 2021/0021485 A1* | 1/2021 | Guim Bernat | H04L 43/087 |

* cited by examiner

METHOD AND SYSTEM FOR PROCESSING SERVICE FUNCTION CHAIN REQUEST

CROSS-REFERENCE TO RELATED APPLICATIONS

The application claims priority of Chinese patent application CN201910684427.0, filed on Jul. 26, 2019, the entire contents of which are incorporated herein by reference.

TECHNICAL FIELD

The disclosure relates to communication technology, in particular to a method and a system for processing a service function chain request.

BACKGROUND

With the rapid development of the Internet and the explosive growth of various applications, users desire to transmit data at a high capacity and a low delay. Therefore, higher data transmission rate of the bearer network and higher processing capacity of the data center are required. Generally, user requests can be modeled by Service Function Chains. And a service function chain may comprise a plurality of network functions. For example, if a user's request goes through a firewall (FW), an intrusion detection system (IDS), and a network address translator (NAT), the service function chain may contain an FW, an IDS, and an NAT.

In a traditional network, network functions are usually deployed in specific physical devices. In this way of deployment, the costs for purchasing, maintaining and upgrading physical devices would be very high. Further, due to the fact that physical devices are usually operated and managed with specific programming languages, the labor cost of the personnel with specific skills to maintain the physical devices would also be very high. In addition, as the scale of the network continues to expand, the number of devices in the existing network and the performance of these devices can no longer meet the needs of emerging applications. Moreover, physical devices are typically deployed at particular nodes in the network. Therefore, the locations of these physical devices may become conditions which should be taken into account when performing path computations for traffic flows that require network functions deployed in these physical devices. Thus, the processing latency of a service function chain would be increased and unnecessary waste on resources would occur.

With the continuous increase of data processing rate and reduction on the cost of storage of central processing unit (CPU), graphics processing unit (GPU) and other computing devices, the network functions realized traditionally in hardware form can now be realized in form of Virtual Network Function (VNF) by utilizing resource virtualization technology, which is called Network Function Virtualization (NFV). NFV technology can greatly reduce the cost of network construction, network operation and network maintenance for service providers. At the same time, because VNFs can be flexibly deployed and dynamically adjusted on physical devices according to business requirements, the utilization efficiency of the bandwidth resources and the computing resources of the network can be greatly improved. Therefore, NFV has become a hot technology of next generation network.

Further, with the emergence of large bandwidth services such as 10 Gbps services and 40 Gbps services, packet switching in the data centers has caused huge processing delay due to frequent optic-electric conversions, which would also greatly consume the energy of data centers. Therefore, traditional packet-based switching can no longer meet the requirements of the high-speed data traffic. While with the advantages of high capacity, large bandwidth, low latency, optical interconnecting technology based on wavelength division multiplexing (WDM) has become the first choice for data center networks or inter-rack connections within data centers. However, compared to the packet processing of electrical switching, the configurations of optical layers of optical interconnecting may cause a higher time delay and a lower processing flexibility. That is, the processing efficiency of services in optical domain is relatively low, and there will be unnecessary waste on bandwidth resources too. Therefore, optical interconnecting technology is not suitable for services that need frequent connects/disconnects, such as low-rate but high-burst services. Moreover, since the data processing rates of VNFs are different, using a VNF with a high data processing rate to process services with small data volume may occupy more computing resources and storage resources than those needed. Thus, competition on resources with services with high data throughput requirements would occur, which results in a degradation on the performance of the network.

SUMMARY

Examples of the disclosure provide a method for processing a service function chain request. The method may include:

classifying a service function chain request received; wherein the service function chain requested by the service function chain request comprises at least one virtual network function VNF;

determining a domain to process the service function chain request; wherein the domain may include one of an optical domain or an electrical domain;

distributing the service function chain request to the domain determined;

determining at least one server for implementing the at least one VNF;

determining the time at which the at least one server implements the at least one VNF.

According to examples of the disclosure, classifying the service function chain request received may include: classifying the service function chain request according to at least one of the rate of the service function chain request or a parameter of Service Level Agreement.

According to examples of the disclosure, determining at least one server for implementing the at least one VNF may include:

acquiring VNF instances in an idle state on each server in the domain to obtain an idle instance set corresponding to the at least one VNF;

constructing a calculation matrix according to the idle instance set, wherein each row of the calculation matrix corresponds to each available server in the domain, each column corresponds to each of the at least on VNF, and each element indicates whether the corresponding server contains the corresponding VNF instance; and selecting at least one server from the available servers to implement the at least one VNF according to the calculation matrix to obtain a server sequence with a minimum number of servers for implementing the service function chain.

According to examples of the disclosure, selecting at least one server from the available servers to implement the at least one VNF may include:

A, setting a data transmission frequency control variable t=0;

B, determining whether the data transmission frequency control variable t is less than or equal to $|F_n|-1$, if so, proceeding to C, otherwise, proceeding to P; wherein $F_n$ is the number of VNFs included in the service function chain;

C, setting a circulation variable i=1;

D, determining whether i is smaller than or equal to t+1, if so, proceeding to E, otherwise, proceeding to M;

E, setting the number of instances of most consecutive VNFs located on the same server as $j=|F_n|$;

F, determining whether the variable j is greater than or equal to 1, and if so, proceeding to G; otherwise, returning to D;

G, performing an AND operation on each row of the calculation matrix and a comparison vector;

H, determining whether the result of the AND operation is equal to the comparison vector or not, if so, proceeding to I; otherwise, proceeding to L;

I, recording the length of the longest VNF instance sequence as j and recording the corresponding row number, taking a cyclic variable i as an index;

J, carrying out a bit-by-bit shift operation on each row in the calculation matrix, and performing a zero padding on each row in the calculation matrix; wherein the number of bits shifted is j;

K, adding 1 on the loop variable i, setting $j=F_n-j$, and returning to F;

L, subtracting 1 from the variable j, and returning to F;

M, determining whether a VNF instance sequence is available, and if so, proceeding to N; otherwise, proceeding to O;

N, returning the server containing the serial number of the corresponding VNF instances and ending;

O, setting t=t+1, and returning to B; and

P, selecting a server with sufficient capacity to create all required VNF instances.

According to examples of the disclosure, the length of the comparison vector is $|F_n|$, the last j bits of the comparison vector are 1, and the first $|F_n|-j$ bits of the comparison vector are 0; the bit-by-bit shift operation may include a bit-by-bit right shift operation, and j-bit zero sequence is padded at the first j bits of each row.

According to examples of the disclosure, the length of the comparison vector is $|F_n|$, the first j bits of the comparison vector are 1, and the last $|F_n|-j$ bits of the comparison vector are 0; the bit-by-bit shift operation includes a bit-by-bit left shift operation and a j-bit zero sequence is padded at the last j bits of each row.

According to examples of the disclosure, selecting at least one server from the available servers to implement the at least one VNF may include: converting each row of the calculation matrix into a decimal value to obtain a vector V;

performing an AND operation on each row of the calculation matrix and a comparison vector may include: performing an AND operation on each element of the vector V and $2^j-1$;

determining whether the result of the AND operation is equal to the comparison vector or not may include: determining whether the result of the AND operation is equal to $2^j-1$ or not; and carrying out a bit-by-bit shift operation on each row of the calculation matrix and performing a zero padding on each row of the calculation matrix may include: shifting each element in the vector V to the right by j bits and padding j bits of zeros at the first j bits.

According to examples of the disclosure, determining whether a VNF instance sequence is available may include:

performing a summation operation on the length of the recorded longest VNF instance sequence; and determining whether the summation result is equal to $|F_n|$, and if so, determining that a VNF instance sequence is available.

According to examples of the disclosure, selecting a server with sufficient capacity to create all required VNF instances may include: selecting a server with sufficient capacity and minimal remaining capacity to create all required VNF instances.

According to examples of the disclosure, determining the time at which the at least one server implements the at least one VNF may include:

determining a processing time delay of the at least one VNF according to the size of the data to be processed and the data processing rate of the VNF; determining a data transmission delay between two servers where any two VNFs according to the length of a pre-configured transmission path and the exchange rate of devices; and determining the time at which the at least one server implements the at least one VNF according to the processing delay and the transmission delay.

According to examples of the disclosure, the method may further include:

counting VNFs contained in service function chains requested by service function chain requests received within a preset time period;

recording the requested frequency of each VNF;

checking whether the requested frequency of each VNF matches the distribution state of each VNF in the system;

if the requested frequency of a VNF does not match the distribution of the VNF in the system, deploying the VNF instance in the server.

According to examples of the disclosure, checking whether the requested frequency of each VNF matches the distribution of each VNF in the system may include:

determining the ratio of the number of instances of each VNF in the system and the number of all VNF instances in the system as the distribution of each VNF in the system; and checking whether the requested frequency of each VNF matches the distribution of the VNF in the system by judging whether the following formula is established:

$$\frac{I_{F_n}}{\sum_{F_k \in T} I_{F_k}} < \frac{C_{F_n}}{\sum_{F_k \in T} C_{F_k}}$$

wherein, T represents the set of instances of all VNFs in the system; $C_{Fn}$ represents the number of times VNF instance $F_n$ is requested; $I_{Fn}$ represents the number of VNF instances $F_n$ in the current system;

if the formula is established for a certain VNF, determining the requested frequency of the VNF does not match the distribution of the VNF in the system.

According to examples of the disclosure, deploying the VNF instance in a server may include: selecting a server that contains the least VNF instances and deploying the VNF instance in the server selected.

According to examples of the disclosure, the method may further include:

presetting a keep-alive time for each VNF instance in the system;

after a certain VNF instance processes the service function chain request, setting the VNF instance to be in an idle state; wherein the maintenance time of the idle state is set as the keep-alive time corresponding to the VNF instance;

if the idle state of a VNF instance ends without the arriving of a new request, removing the VNF instance from the server.

According to examples of the disclosure, the method may further include:

after determining the time at which the at least one server processes the at least one VNF, configuring the time and the corresponding VNF to be processed to the corresponding server of the at least one server; and processing by each server the corresponding VNF at the time configured.

Examples of the disclosure provide a system for processing a service function chain request. The system may include:

a request discriminator, to classify a service function chain request received and determine a domain to process the service function chain request; wherein the service function chain requested by the service function chain request may include at least one VNF; the domain may include one of an optical domain or an electrical domain;

a reconfigurable optical add-drop multiplexer (ROADM), to distribute the service function chain request to the domain determined; wherein, the ROADM may distribute the service function chain request to be processed in the optical domain to the optical domain data center and distribute the service function chain request to be processed in the electrical domain to the electrical domain data center according to the classification result of the request discriminator;

a software definition network controller, to control the request discriminator and set classification rules of the request discriminator; and configure the ROADM;

an optical domain data center connected to the ROADM, wherein the optical domain data center comprises at least one VNF;

an electrical domain data center connected to the ROADM, wherein the electrical domain data center comprises at least one VNF; and a network function virtualization controller, to monitor and maintain the operation state of the at least one VNF in the optical domain data center and the electric domain data center and adjust the deployment of the at least one VNF.

According to examples of the disclosure, the optical domain data center may include:

at least one wavelength selective switch (WSS); and at least one optical domain server connected to the at least one WSS; wherein, the at least one optical domain server includes at least one VNF; the at least one WSS is used for performing wavelength exchange between the at least one optical domain server and the ROADM.

According to examples of the disclosure, the electric domain data center may include:

at least one electric domain server; and a switch for connecting the at least one electric domain server and the ROADM; wherein the at least one electric domain server includes at least one VNF.

According to examples of the disclosure, the system may further include:

a coordination controller; and an Operation Support System/Business Support System OSS/BSS, configured to perform policy distribution and parameter setting on the network function virtualization controller and the software definition network controller through an API and the coordination controller.

According to the method and system for processing a service function chain request provided by examples of the disclosure, by classifying the service function chain request, a high-speed service function chain request can be distributed to the VNFs in the optical domain with a higher throughput for processing, and a high-burstiness and low-speed service can be distributed to the VNFs in the electrical domain for processing. Meanwhile, through the NFV controller, the network state can be monitored and recorded in real time, and then the deployment of the VNFs can be adjusted accordingly, the requirements of the services can be flexibly met, and the waste on bandwidth resources or storage resources caused by the changes of the services can be reduced. Therefore, on one hand, the method and system for processing a service function chain request provided by examples of the disclosure performs a differentiated processing on different service function chain requests through service discrimination, which improves the utilization efficiency of the computing resources and the bandwidth resources in data centers, reduces the network congestion rate and improves the performance of the network. On the other hand, by monitoring the service and the network state in real time, the deployment of the VNFs in the data centers can be adjusted in time so as to adapt the system to different applications, thereby the adaptability and self-adjustment capability of the network would be achieved.

DETAILED DESCRIPTION OF THE EMBODIMENTS

To further clarify the objects, aspects and advantages of the disclosure, a more specific description of the disclosure will be given by reference to specific examples which are illustrated in the appended drawings.

As described above, in view of the NFV technology, there is an urgent need for a data center of an optical network being capable of processing different service function chain requests in different ways, in which different requests can be processed differently according to their characteristics and the deployment of virtual network functions can be adjusted dynamically according to different network conditions.

Figure 1:
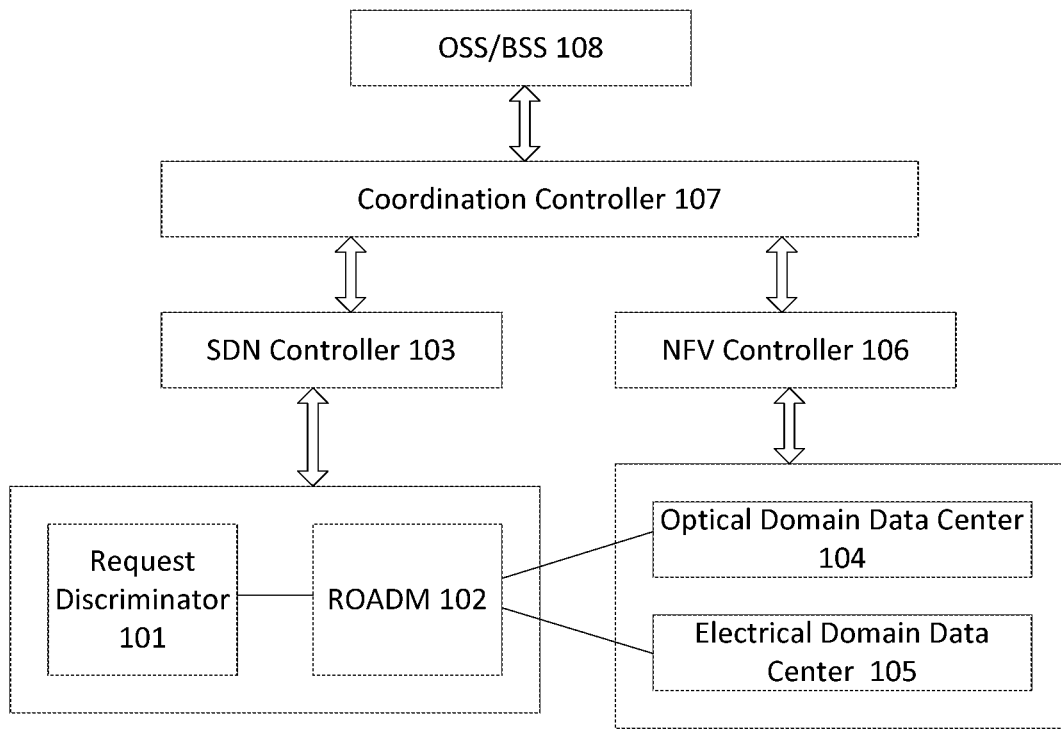
FIG. 1 is a diagram illustrating the structure of a system for processing a service function chain request provided by examples of the disclosure.

In order to solve the problems described above, an example of the disclosure provides a system for processing a service function chain request, the structure of which is shown in FIG. 1 and according to FIG. 1, the system includes the following modules: a request discriminator 101, a reconfigurable optical add-drop multiplexer (ROADM) 102, an SDN controller 103, an optical domain data center 104, an electrical domain data center 105 and an NFV controller 106.

Wherein, the request discriminator 101 is configured to classify a service function chain request which is received from an external network and determine a domain to process the service function chain request.

According to examples of the disclosure, the domain may be an optical domain or an electrical domain.

In accordance with examples of the disclosure, the request discriminator 101 may be located at a network portal throughout the data center.

The ROADM 102 is configured to distribute the service function chain request to the domain determined.

Specifically, the ROADM 102 may distribute the service function chain request determined to be processed in the optical domain to the optical domain data center and distributed the service function chain request determined to be processed in the electrical domain to the electrical domain data center according to the classification result of the request discriminator 101.

The SDN controller 103 is configured to control the request discriminator 101, set classification rules of the request discriminator 101; and configure the ROADM 102 to implement the distributing of the service function chain request between the optical domain and the electrical domain.

In an example of the disclosure, the SDN controller 103 may reconfigure the ROADM 102 according to the classification result of the request discriminator 101. For example, for small-grained services, the ROADM 102 may directly drop the service to the electrical domain data center for processing. And for services that need to be processed in the optical domain, the ROADM 102 may route the service to the optical domain data center for processing.

In an example of the disclosure, the request discriminator 101 may determine whether the current service function chain request needs to be processed in the optical domain or in the electrical domain based on the rate of the service function chain request or at least one parameter of Service Level Agreement (SLA), such as the delay parameter. For example, the request discriminator 101 may determine that a high-speed service function chain request should be handled by high-throughput VNFs in the optical domain, while a low-speed but high-burst service function chain request should be processed by VNFs in the electrical domain. The classification rules described above can be configured by the SDN controller 103.

The optical domain data center 104 connected to the ROADM may include at least one VNF; wherein, each of the at least one VNF is used for implementing a virtual network function in the optical domain.

The electrical domain data center 105 connected to the ROADM may include at least one VNF; wherein, each of the at least one VNF is used for implementing a virtual network function in the electrical domain.

The NFV controller 106 is configured to monitor and maintain the operation states of the VNFs of the optical domain data center 104 and the electric domain data center 105 and adjust the deployment of the VNFs to adapt to the requirements of services flexibly and thus to reduce the waste of bandwidth or storage resources caused by changes of the services.

In an example of the disclosure, the SDN controller 103 may further monitor and record the state of the service function chain request and the state of the network and exchange necessary information with the NFV controller 106 to assist the NFV controller 106 in adjusting the deployment of the VNFs.

In addition, both the NFV controller 106 and the SDN controller 103 can communicate with a coordination controller 107 via an upper layer interface (also referred to as a north interface). The coordination controller 107 may support an Operation Support System/Business Support System (OSS/BSS) 108 through an Application Programming Interface (API). Specifically, the OSS/BSS 108 may perform policy distributions such as classification rules distributions, parameter setting, etc. through the API and the coordination controller 107.

The system for processing a service function chain request shown in FIG. 1 is actually a data center with efficient service function chain request processing capability based on network function virtualization. In the system shown in FIG. 1, the data center is divided into an electric domain data center responsible for processing services with smaller granularity and an optical domain data center responsible for processing services with larger granularity. The electric domain data center and the optical domain data center are cooperatively managed by the SDN controller 103 and the NFV controller 106. Specifically, operations related to VNF creation, deletion, maintenance, and etc. are performed by the NFV controller 106; and operations related to traffic monitoring, network element configuration, and etc. are performed by the SDN controller 103. The SDN controller 103 and the NFV controller 106 may exchange necessary information in messaging, such as user requests and the state of the network monitored by the SDN controller 103, the running state of the VNFs maintained by the NFV controller 106, and the like.

In FIG. 1, a service function chain request entering the data center may first be classified by the request discriminator 101 to determine a domain to process the service function chain request. That is, whether the service function chain request should be processed by the electrical domain data center or the optical domain data center. According to examples of the disclosure, the request discriminator 101 may be configured and managed by the SDN controller 103. For example, the SDN controller 103 may distribute different classification rules to the request discriminator 101. In addition, the SDN controller 103 may configure the ROADM 102 based on the classification result. For example, for services with smaller granularity, the ROADM 102 may directly drop the service to the electrical domain data center. This is because VNFs in the electrical domain are typically small in volume and have limited processing rate, but for services with smaller granularity, the processing flexibility is high and the configuration time is short. For services that need to be processed by the optical domain, the ROADM 102 may directly route the service to the optical domain data center according to the wavelength information of the service. Thus, deployment of the VNFs in the electrical domain, deployment of the VNFs in the optical domain, state monitoring and dynamic adjustment can all be accomplished by the NFV controller 106. And the NFV controller 106 can perform policy distribution on VNFs in the electrical domain data center and the optical domain data center.

In an example of the disclosure, the optical domain data center 104 may include: at least one WSS and at least one optical domain server connected to each other; the at least one optical domain server includes at least one VNF; the at least one WSS is used for wavelength exchange between the at least one optical domain server and the ROADM 102.

In an example of the disclosure, the electric domain data center 105 may include: at least one electrical domain server and a switch for connecting the at least one electrical domain server and the ROADM 102. Wherein, the at least one electric domain server may include at least one VNF.

In an example of the disclosure, the electric domain servers may also be connected to each other via a switch.

Figure 2:
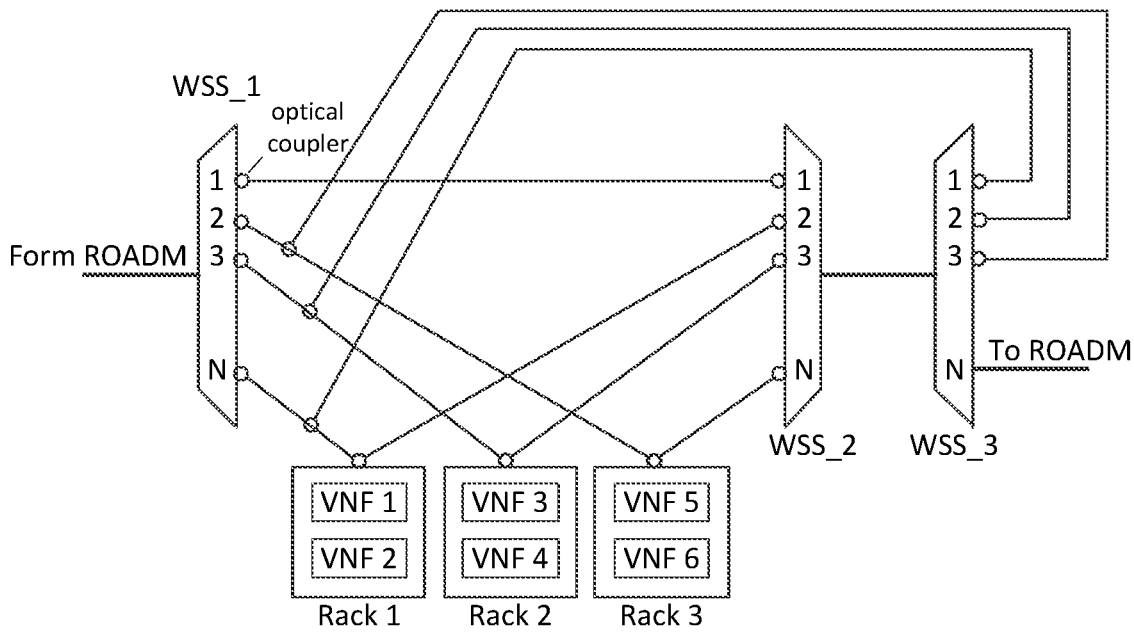
FIG. 2 is a diagram illustrating the structure of an optical domain data center in accordance with one example of the disclosure.

FIG. 2 shows the structure of the optical domain data center according to an example of the disclosure. As shown in FIG. 2, in this example, the optical domain data center includes three WSSs: WSS_1, WSS_2, WSS_3, and three racks (i.e., optical domain servers). There are two VNFs per rack. As shown in FIG. 2, the three WSSs are connected to the three racks. The configuration of the WSSs by the SDN controller 103 enables wavelength exchanges between any racks. For example, as shown in FIG. 2, the WSS may be a 1*N structure, and by configuration, any wavelength output from a certain port may be realized. As another example, port N of WSS_3 is used to send data back to the ROADM. And as shown in FIG. 2, the optical links split by the WSSs may be connected to each other by optical couplers, for example, each hollow circle in FIG. 2 represents one optical coupler. Through these connections, transparent transmission of services can be realized. Also, each rack has a transmitter TX that can modulate the data processed by the VNF onto a certain wavelength and then transmit. Taking the service with a service function chain request VNF 3–>VNF 5 and the entrance wavelength is wl as an example, assuming that the available wavelength in the system is w3, a transparent transmission of wl–>VNF 3–>w3–>VNF 5–>wl can be realized by configuring port 3 of WSS_1 to use wavelength wl and port 3 of WSS_3 to use wavelength w3.

According to the system for processing a service function chain request provided by examples of the disclosure, by classifying the service function chain request, a high-speed service function chain request can be distributed to the VNFs with a higher routing throughput in the optical domain for processing, and a high-burst and low-speed service can be distributed to the electrical domain for processing. In addition, for services processed in the optical domain, services carried by different wavelengths may be transmitted to a VNF server required by the WSS for high-speed processing. Meanwhile, through the NFV controller 106, the state of the network can be monitored and recorded in real time, the deployment of the VNFs can be adjusted accordingly, the requirements of the services can be flexibly met, and the waste on bandwidth resources or storage resources caused by the changes of the services can be reduced. Therefore, on one hand, the system for processing a service function chain request provided by examples of the disclosure performs a differentiated processing on different service function chain requests through service discrimination, which improves the utilization efficiency of computing resources and network bandwidth resources in a data center optical network, reduces the network congestion rate and improves the network performance. On the other hand, by monitoring the service and the state of the network in real time, the deployment of the VNFs in the data center can be adjusted in time so as to adapt to different applications with different types, or various distributions, thereby adaptability and self-adjustment capability of the network can be achieved.

Figure 3:
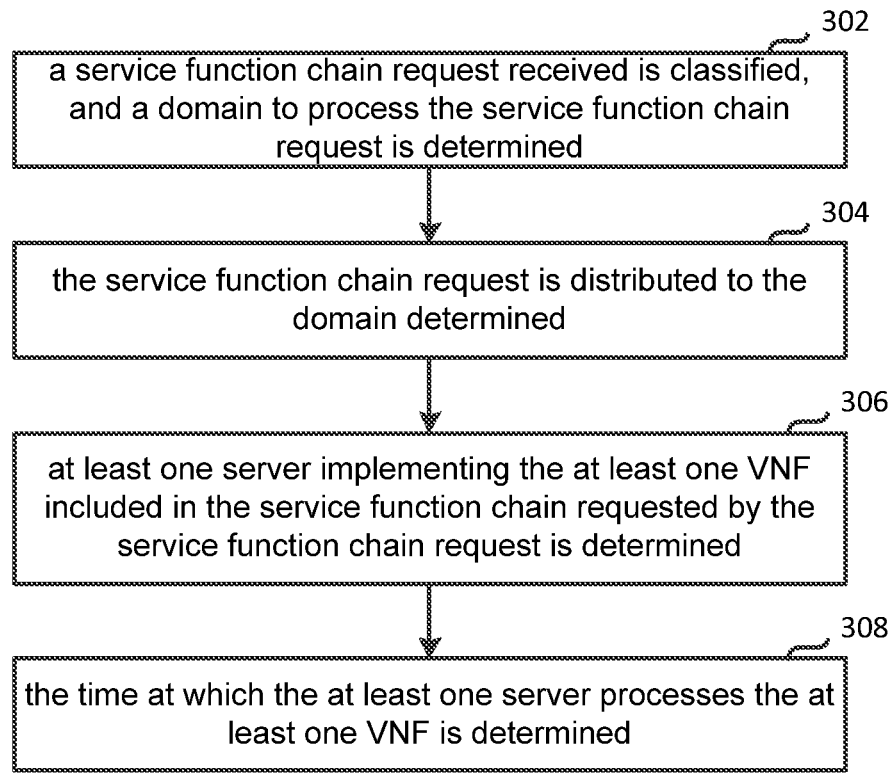
FIG. 3 is a flowchart illustrating a method for processing a service function chain request according to an example of the disclosure.

Based on the above system for processing a service function chain request, examples of the disclosure also provide a method for processing a service function chain request. The procedure of the method for processing a service function chain request is shown in FIG. 3, which includes the following steps:

In step 302, a service function chain request received is classified, and a domain to process the service function chain request is determined.

In examples of the disclosure, the domain may be an optical domain or an electrical domain. That is, in this step, whether the service function chain request is to be processed in the optical domain or the electrical domain is determined.

In examples of the disclosure, a service function chain requested by the service function chain request may include at least one VNF.

In examples of the disclosure, the above step may be performed by the request discriminator 101 under the control of the SDN controller 103.

In examples of the disclosure, classifying the service function chain request received may be implemented based on the rates of the service function chain requests. Specifically, the rate discrimination threshold can be set as T Gbps in advance, so that when the rate requirement of the service function chain request is larger than T Gbps, the service function chain request may then be determined to be processed in the optical domain; otherwise, the service function chain request may be determined to be processed in the electrical domain. It should be noted that the above-mentioned rate discrimination threshold T Gbps can be flexibly adjusted according to practical requirements. In addition, besides the rate parameter, parameters related to the SLA, such as the time delay and the like, can also be used as the judgment reference. Moreover, the judgment reference can be flexibly adjusted and any two or more judgment references can be combined according to different strategies. For example, if the amount of data to be processed is large and the delay requirement is high (less than a certain threshold), the service function chain request can be determined to be processed in the optical domain; while in the case of small data packets, for the delay requirement is relatively high, the service function chain request may be determined to be processed in the electric domain in which that the processing may be relatively fast. In addition, the SLA contains many parameters, and the time delay is one of the parameters, so that the classification rule can be set according to one or more parameters in the SLA, to ensure the classification to be more accurate.

After the domain to process the service function chain request is determined, the service function chain request may then be distributed to the domain determined in step 304.

That is, if the service function chain request is determined to be processed in the optical domain, the service function chain request would then be transmitted to the optical domain data center. And if the service function chain request is determined to be processed in the electrical domain, the service function chain request would then be transmitted to the electrical domain data center.

And in step 306, a server mapping on the service function chain request allocated to the electric domain or the optical domain is performed, and thus at least one server implementing the at least one VNF included in the service function chain requested by the service function chain request is then determined.

It needs to be explained that in the above step, after the server mapping on the service function chain request distributed to the electric domain is carried out, each server determined to implement the network function requested by the service function chain will be a server in the electric domain; and after the server mapping on the service function chain request distributed to the optical domain is carried out, each server determined for implementing the network function requested by the service function chain will be a server in the optical domain.

Figure 4:
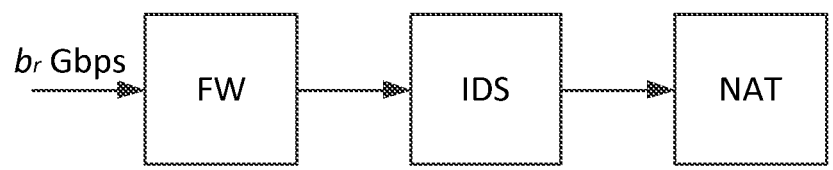
FIG. 4 shows an example of a service function chain request.

In an example of the disclosure, the service function chain request may be denoted as r with a data transmission rate parameter br Gbps and the requested service function chain may be denoted as Sr, where $Sr=<F1, F2, \ldots, F_n>$, $F_n$ is the VNF contained in the service function chain. Here, the service function chain Sr denotes a set of network functions arranged in a specific order. That is, a service function chain request needs to be processed sequentially through each network function in the chain. FIG. 4 shows an example of a service function chain request. As shown in FIG. 4, the data transmission rate parameter requested by the service function chain is br Gbps, and the requested service function chain includes three network functions, such as FW, IDS, and NAT. That is, the service function chain request needs to be processed sequentially through the FW, IDS, and NAT described above.

Assuming that each VNF would bring a certain processing delay $L_F$ to process the user request, and the transmission of the requested data between the VNFs would also bring a transmission delay $L_T$, the aim of performing the server mapping in this step is to determine each server implementing the network functions requested by the service function chain of a certain service function chain request, so that the total delay for processing the service function chain request is as small as possible.

As those skilled in the art would know, the processing delay $L_F$ caused by each VNF processes the user requests may be considered to be substantially fixed, however, the transmission delay $L_T$ may vary widely from VNF to VNF. For example, when two adjacent VNFs are located at the same server, the transmission delays of these two VNFs may be substantially negligible. When two adjacent VNFs are located at different servers, the transmission delay of the two VNFs may be large. In this case, the object of the server mapping in this step can be converted into that for a certain service function chain request, to determine at least one server which implements the network function requested by the service function chain with a smallest total transmission delay of the service function chain request. That is, the number of times that the service function chain request is transmitted among a plurality of servers should be as small as possible to avoid excessive transmission delays due to frequent transfers between servers.

Specific methods for determining the at least one server that implement the requested network functions of the chain of service functions will be described in detail in the examples that follow.

In examples of the disclosure, after each server for implementing the network functions requested by the service function chain is determined, the NFV controller 106 can control the wavelength exchange of each WSS of the optical domain data center to configure of the transmission path requested by the service function chain to be processed in the optical domain; or the NFV controller 106 can control each electric domain server of the electric domain data center to configure the transmission path requested by the service function chain to be processed in the electric domain.

And in step 308, a time planning on the at least one server is performed, thus the time at which the at least one server processes the at least one VNF is determined.

In examples of the disclosure, the time planning specifically includes the following steps:

Firstly, the processing delay of each of the at least one VNF is determined according to the size of the data to be processed and the data processing rate of the VNF.

Then, the data transmission delay between each two VNF servers is determined according to the length of a pre-configured transmission path and the exchange rate of devices.

And finally, the moment when the at least one server processes the at least one VNF is determined according to the processing delay and the transmission delay.

Specifically, for the service function chain request assigned to the optical domain, for each VNF instance to process user data, the NFV controller may estimate the processing delay for each VNF instance based on the amount of user data to be processed and the data processing rate of the VNF instance. Meanwhile, the data transmission delay between the optical domain servers where two VNFs are located is estimated according to the length of the configured transmission path, the exchange rate of devices and the like. And on this basis, the moment when the VNF instance on each optical domain server starts processing the service function chain request may be preset. For example, before processing the user data, a following VNF instance should first wait for a preceding VNF instance to process the user data, and then wait for the user data to be transferred from the server where the preceding VNF instance is located to the server where the following VNF instance is located.

In examples of the disclosure, for a service function chain request assigned to the electrical domain, the NFV controller may perform a VNF time planning in a manner similar to that described above in the optical domain. The difference is that the estimation of the data transmission delay of the electrical domain should be based on the processing rate of the electrical domain device, e.g. the switching rate of a switch, the packet forwarding rate of a router, etc.

After determining the time at which the at least one server processes the corresponding VNF, the NFV controller 106 can configure the determined time and the VNF to be executed corresponding to the time to the at least one server, and then each server executes the corresponding VNF according to the configured time, thereby the processing of the service function chain request can be implemented effectively.

Therefore, the method for processing a service function chain request provided by examples of the disclosure may have the following advantages. On one hand, different service function chain requests can be processed differently through service classification, thus the utilization efficiency of computing resources and network bandwidth resources in the data centers can be improved. On the other hand, the network congestion rate can be reduced, the network performance can be improved, and the processing delay of the service function chain requests can be reduced through VNF mapping and time planning.

Figure 5:
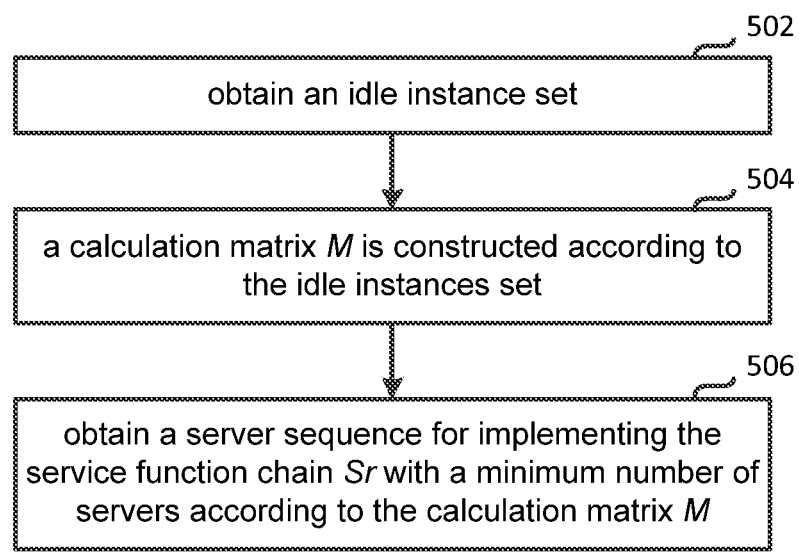
FIG. 5 is a flowchart illustrating a server mapping method according to an example of the disclosure.

In order to determine the at least one server that implement the network functions requested by the service function chain and to ensure that the service function chain request is delivered in a minimum number of times among the servers, examples of the disclosure provide a server mapping method that is primarily performed by the NFV controller 106. FIG. 5 shows a flowchart of the server mapping method according to examples of the disclosure. As shown in FIG. 5, the method may include:

In step 502, VNF instances in an idle state on each server may be acquired to obtain an idle instance set corresponding to the service function chain request r.

In examples of the disclosure, the VNF instance described above refers to a specific instance in which the VNF is installed, i.e., a program unit that processes user data. Typically, there may be multiple VNF instances per VNF in the system, so VNF instances in an idle state may be a collection. For example, for the service function chain $Sr=<F1, F2, \ldots, F_n>$ requested by the service function chain request r, the idle instances set thereof may be denoted as $<Q_{F1}, QF_2, Q_{Fn}>$.

In order to avoid unnecessary waste on resources and increasement of delay caused by frequently transfers of service function chain requests among a plurality of servers, the situation that two or more adjacent VNF instances in the chain are located in the same server needs to be preferentially selected.

And in step 504, a calculation matrix M is constructed according to the idle instances set, wherein each row of the calculation matrix M corresponds to each available server <E1, E2, . . . , Em>, each column of the calculation matrix M corresponds to each VNF in the service function chain Sr, and each element in the calculation matrix M indicates whether the corresponding server contains the corresponding VNF instance.

For example, in examples of the disclosure, if the server Em contains an instance of $F_n$, the element of the calculation matrix may have a value of 1, or otherwise, the element of the calculation matrix may have a value of 0. Thus, each row of the calculation matrix M described above indicates whether the corresponding server has each VNF instance.

For example, the calculation matrix M shown in the following formula (1) represents an example where the server E1 contains F1, F2, F4 and F6; server E2 contains instances of F1, F2 and F3; server E3 contains instances of F4, F5, and F6.

$$M = \begin{bmatrix} 110101 \\ 111000 \\ 000111 \end{bmatrix} \quad (1)$$

And in step 506, at least one server is selected from available servers <E1, E2, and Em> to realize all VNFs in the service function chain Sr according to the calculation matrix M to obtain a server sequence for implementing the service function chain Sr with a minimum number of servers.

Figure 6:
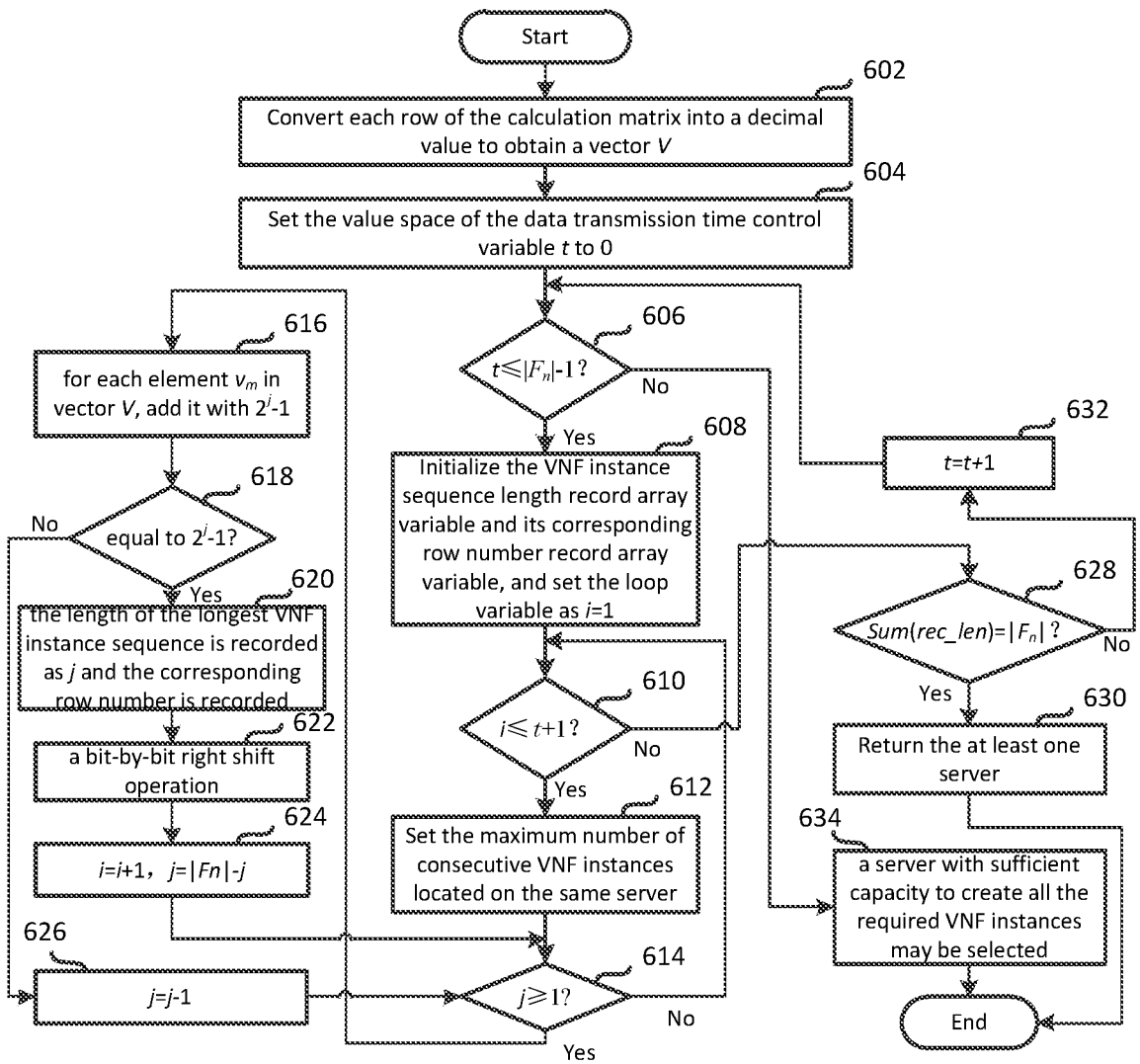
FIG. 6 is a flowchart illustrating a method for selecting at least one server from available servers to implement all VNFs in a service function chain according to a calculation matrix in accordance with an example of the disclosure.

In examples of the disclosure, the specific implementation of step 506 described above may refer to FIG. 6 and may specifically include the following steps:

In step 602, each row of the calculation matrix M may be converted into a decimal value to obtain a vector V.

For example, based on the calculation matrix M shown in the above formula (1), a vector V shown in the following formula (2) can be obtained.

$$V = \begin{bmatrix} 53 \\ 56 \\ 7 \end{bmatrix} \quad (2)$$

In step 604, the value space of the data transmission time control variable t may be set to be $[0, |F_n|-1]$, and the following attempts may be started from t=0.

In step 606, whether the data transmission number control variable t is less than or equal to $|F_n|-1$ is determined, if so, proceed to step 608, otherwise, proceed to step 634.

In step 608, the VNF instance sequence length record array variable rec_len and its corresponding row number record array variable rec_index may be initialized, and the loop variable may be set as i=1.

In an example of the disclosure, the value space of the above-mentioned cyclic variable i is [1, t+1].

In examples of the disclosure, when the variables are initialized at this step, rec_len and its corresponding rec_index may both be set to null.

In step 610, whether i is less than or equal to t+1 may be determined, if so, proceed to step 612, otherwise, proceeds to step 628.

In step 612, the maximum number of consecutive VNF instances located on the same server may be set as $j=F_n$.

In an example of the disclosure, the number of instances with the maximum number of consecutive VNFs located on the same server as described above ranges from $|F_n|$ to 0.

In step 614, whether the variable j is greater than or equal to $2^j-1$ is determined, and if so, proceed to step 616; otherwise, return to step 610.

In step 616, for each element $v_m$ in vector V, add it with $2^j-1$.

In step 618, whether the operation result is equal to $2^j-1$ or not is determined, and if so, proceed to step 620; otherwise, proceed to step 626.

In step 620, the length of the longest VNF instance sequence is recorded as j and the corresponding row number is recorded, i.e., let rec_len[i]=j, and the corresponding row number is recorded at rec_index[i], indexed by the loop variable i.

In step 622, a bit-by-bit right shift operation on each element in the vector V may be performed, and a zero padding may be performed on the left of the vector; where the number of bits shifted to the right is j.

In step 624, the loop variable i is added with 1, and then sets $j=|F_n|-j$, and returns to step 614.

In step 626, the variable j is subtracted with 1, and then returns to step 614.

In step 628, whether a VNF instance sequence is available is determined, and if so, proceed to step 630; otherwise, proceed to step 632.

Specifically, in an example of the disclosure, in order to determine whether a VNF instance sequence is available, rec_len[i] may be summed, denoted as sum(rec_len), and then it is determined whether sum(rec_len) is equal to $|F_n|$, if so, indicating that an available VNF instance sequence is found.

In step 630, the at least one server containing the corresponding VNF instance sequence number, rec_index[i], is returned and the procedure completes.

The at least one server containing the sequence number of the corresponding VNF instance can be used as a server sequence implementing a service function chain.

In step 632, let t=t+1, then return to step 606.

In step 634, a server with sufficient capacity to create all the required VNF instances may be selected.

In examples of the disclosure, a server with sufficient capacity and minimal remaining capacity may be selected to create all required VNF instances. Therefore, resources of the working servers can be used up as far as possible, so that the situation that more servers are activated but only part of resources are used by each server may be avoided, thus the consumption of electric energy of the servers can be reduced, and the effect of saving resources, such as electric energy, can be achieved.

It can thus be seen that the server mapping can be achieved quickly by the steps 602-634 described above, and it can be ensured that the number of transfers between servers of the service function chain request can be minimized, so that the time delay of the service function chain request can be minimized, and any waste on resources can also be avoided.

Figure 7:
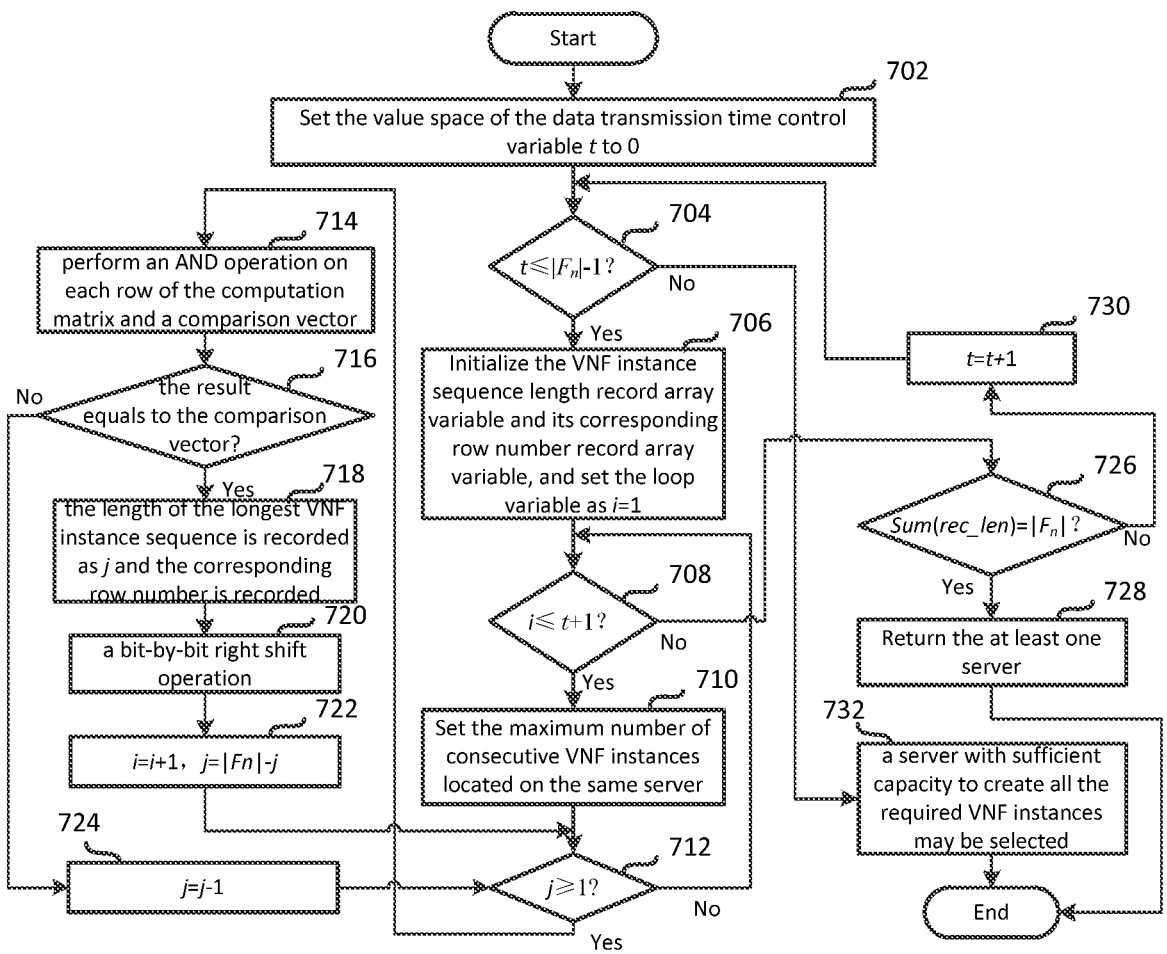
FIG. 7 is a flowchart illustrating a method for selecting at least one server among available servers to implement all VNFs in a service function chain according to a calculation matrix according to another example of the disclosure.

It should be noted that the method described in the steps 602-634 above is only one example of implementing the server mapping and the server mapping may be implemented in other ways. For example, instead of converting each row of the computation matrix M to a decimal value as described above in step 602, the binary value may be directly used in one example of the disclosure. In this case, the server mapping process can be as shown in the following FIG. 7, mainly comprising:

In step 702, the value space of the data transmission number control variable t is set to $[0, |F_n|-1]$, and the following attempts may be started from t=0.

In step 704, whether the data transmission number control variable t is less than or equal to $|F_n|-1$ is determined, if so, proceed to step 703, otherwise, proceed to step 732.

In step 706 the VNF instance sequence length record array variable rec_len and its corresponding row number record array variable rec_index are both initialized, and the loop variable is set as i=1.

In examples of the disclosure, the value space of the above-mentioned cyclic variable i is [1, t+1].

In examples of the disclosure, when the variables are initialized at this step, rec_len and its corresponding rec_index may both be set to null.

In step 708, whether i is less than or equal to t+1 may be determined, if so, proceed to step 710, otherwise, proceeds to step 726.

In step 710, the maximum number of consecutive VNF instances located on the same server may be set as $j=F_n$.

In an example of the disclosure, the number j of instances of the most consecutive VNFs located on the same server as described above ranges from $|F_n|$ to 0.

In step 712, whether the variable j is greater than or equal to 1 is determined, and if so, proceed to step 714; otherwise, return to step 708.

In step 714, each row of the computation matrix M is performed an AND operation with a comparison vector.

In examples of the disclosure, the length of the comparison vector is $|F_n|$, wherein the last j bits are 1, and the remaining bits (first $|F_n|-j$ bits) are 0; or the length of the comparison vector is $|F_n|$ the first j bits of the comparison vector are 1, and the remaining bits (the last $|F_n|-j$ bits) of the comparison vector are 0. In particular, $2^j-1$ can be converted to a binary number and padded with $|F_n|-j$ zeros either at the first $|F_n|-j$ bits or at the last $|F_n|-j$ bits, resulting in a vector with a length of $|F_n|$.

In step 716, whether the result of the AND operation is equal to the comparison vector or not is determined, and if so, proceed to step 718; otherwise, proceed to step 724.

In step 718, the VNF instance sequence length is recorded as j and the corresponding row number is recorded, i.e., let rec_len[i]=j, and the corresponding row number is recorded at rec_index[i], indexed by the loop variable i.

In step 720, a bit-by-bit shift operation on each row of the calculation matrix M is carried out, and a zero padding on the other bits is performed; wherein the number of bits to be shifted is j.

In an example of the disclosure, if the comparison vector is a comparison vector having a length of $|F_n|$, with the last j bits of 1, and the remaining bits (first $|F_n|-j$ bits) of 0, the bit-by-bit shift operation is a bit-by-bit right shift operation, and zero padding is performed at the first j bits of each row of the calculation matrix. If the length of the comparison vector is $|F_n|$, the first j bits of the comparison vector are 1, and the remaining bits (the last $|F_n|-j$ bits) are 0, the bit-by-bit shift operation is a bit-by-bit left shift operation, and a zero padding is performed at the last j bits of each row of the calculation matrix.

In step 722, the loop variable i is added with 1 and sets $j=|F_n|-j$, and then returns to step 712.

In step 724, variable j is subtracted with 1, and then returns to step 712.

In step 726, whether an available VNF instance sequence can be found is determined, and if so, proceed to step 728; otherwise, proceed to step 730.

Specifically, in an example of the disclosure, in order to determine whether an available VNF instance sequence can be found, rec_len[i] may be summed, denoted as sum (rec_len), and it is determined whether sum(rec_len) is equal to $|F_n|$, if so, indicating that an available VNF instance sequence is found.

In step 728, the at least one server containing the corresponding VNF instance sequence number, rec_index[i], is returned and the procedure completes.

The at least one server containing the sequence number of the corresponding VNF instance can be used as a server sequence implementing a service function chain.

In step 730, let t=t+1, then return to step 704.

In step 732, a server with sufficient capacity to create all the required VNF instances may be selected.

In an example of the disclosure, a server with sufficient capacity and minimal remaining capacity may be selected to create all required VNF instances. Therefore, resources of the activated servers can be used up as far as possible, so that the situation that more servers are activated but only part of resources are used by each server may be avoided, the consumption of electric energy of the servers can be reduced, and thus the resources can be saved.

It can thus be seen that the server mapping can be achieved quickly by the steps 702-732 described above, and it can be ensured that the number of transfers between servers to process the service function chain request can be minimized, so that the time delay of the service function chain request can be minimized, and the waste on resources can also be avoided.

Figure 8:
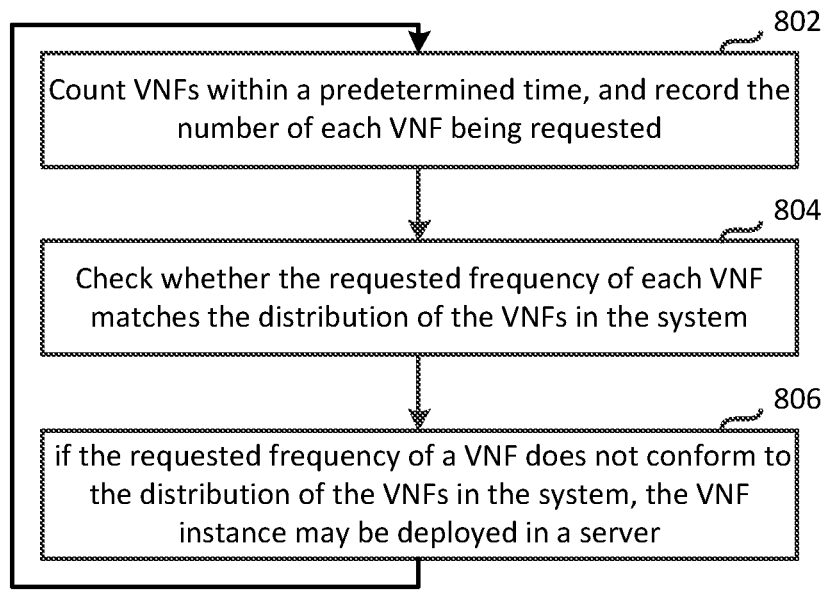
FIG. 8 is a flowchart illustrating a method for adjusting the deployment of VNFs in a data center in accordance with one example of the disclosure.

In order to further adapt to different applications, the data center may have a better network adaptability and self-adjustment capability. On the basis of the technical scheme provided by the above examples of the disclosure, a scheme for timely adjusting the deployment of the VNFs in the data center by monitoring the service and the state of the network in real time is further introduced. The method for adjusting the deployment of the VNFs in the data center according to some examples of the disclosure can refer to FIG. 8, and the method includes the following steps:

In step 802, VNFs requested by service function chain requests received within a predetermined time $T_{det}$ are counted, and the number of each VNF being requested is recorded.

In some examples of the disclosure, a counter may be set for each VNF to record the number the VNF being requested. For example, a counter $C_{Fn}$ is set to indicate the number $F_n$ being requested.

In step 804, whether the requested frequency of each VNF matches the distribution of the VNFs in the system is checked.

In some examples of the disclosure, the distribution of VNFs in the system represents the ratio of the actual number of the VNF instances in the system and all VNF instances in the system. Then, the checking whether the requested frequency of each VNF matches the distribution of the VNF in the system can be accomplished by detecting whether formula (3) below can be established.

$$\frac{I_{F_n}}{\sum_{F_k \in T} I_{F_k}} < \frac{C_{F_n}}{\sum_{F_k \in T} C_{F_k}} \quad (3)$$

In formula (3), T represents the set of instances of all VNFs in the system; $C_{Fn}$ denotes the number of $F_n$ being requested and $I_{Fn}$ denotes the number of instances of $F_n$ in the system.

When formula (3) above is established, it is shown that the number of instances of $F_n$ in the system is insufficient to serve all service function chain requests, i.e. the VNF corresponding to instance $F_n$ is requested at a frequency which does not conform to the distribution of the VNF in the system. And when the above formula (3) does not hold, it is shown that the number of instances of $F_n$ in the system can serve all service function chain requests, that is, the requested frequency of the VNF corresponding to the instance $F_n$ conforms to the distribution of the VNF in the system.

In some examples of the disclosure, the steps 802 and 804 described above may be implemented by the SDN controller 103 described above.

In step 806, if the requested frequency of a VNF does not conform to the distribution of the VNFs in the system, the VNF instance may be deployed in a server.

In some examples of the disclosure, the VNF instance may be deployed by selecting a server that contains the least VNF instances and deploying the VNF instance in the server selected. Therefore, the number of identical VNF instances being repeatedly deployed on one server can be minimized, and the number of different VNFs being deployed on the same server can be maximized, so that the time delay of service function chain requests can be reduced, and the waste on resources can be avoided.

In some examples of the disclosure, the step 806 described above may be implemented by the NFV controller 106 described above.

In some examples of the disclosure, the above steps 802-806 may be repeated executed once every predetermined time $Td_{det}$, for example, the SDN controller may reset the above counter of each VNF every predetermined time $T_{det}$ to clear the influence of previous state of the network to improve the adaptability of resource allocation. Note that this predetermined time interval can be set according to different adjustment policies.

Figure 9:
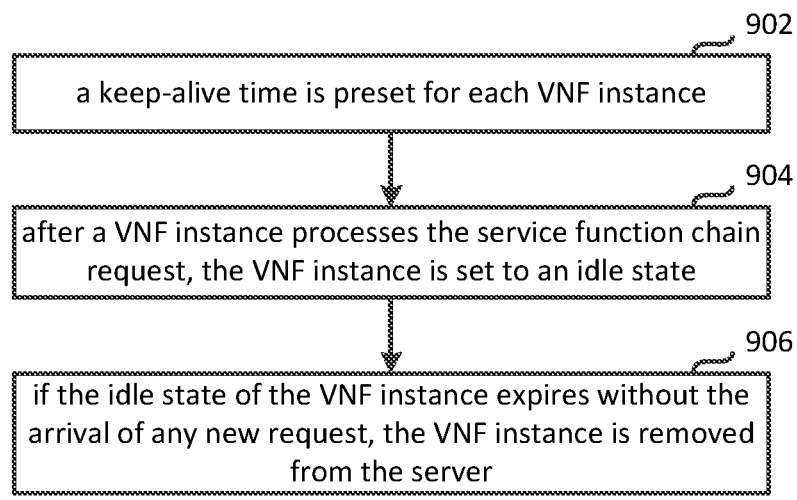
FIG. 9 is a flowchart illustrating a method for adjusting the deployment of VNFs in a data center in accordance with another example of the disclosure.

Some examples of the disclosure also provide another method for adjusting the deployment of the VNFs in the data center. As shown in FIG. 9, the method may specifically include:

In step 902, a keep-alive time is preset for each VNF instance.

In step 904, after a VNF instance processes the service function chain request, the VNF instance is set to an idle state, wherein the maintenance time of the idle state is set to the keep-alive time corresponding to the VNF instance.

In step 906, if the idle state of the VNF instance expires without the arrival of any new request, the VNF instance is removed from the server to save computational and storage resource usage.

In particular, in some examples of the disclosure, a timer may be set for each VNF instance $F_n$ with a duration of its corresponding keep-alive time $K_{Fn}$. After a VNF instance $F_n$ has processed the service function chain request, its corresponding timer is cleared. When the timer of a VNF instance $F_n$ counts to its corresponding keep-alive time $K_{Fn}$, that is, when the timer expires, the VNF instance is removed from the server.

In some examples of the disclosure, the steps 902-906 described above may be implemented by the NFV controller 106. Further, the NFV controller 106 may set the keep-alive time according to instructions received through the API and the coordination controller.

Therefore, in the examples of the disclosure, by monitoring the services and the state of the network in real time, user can adjust the deployment of the VNFs in the data center in time to adapt to different applications. Therefore, the system can have adaptability and self-adjustment capability.

Hereinafter, the process of the server mapping method according to some examples of the disclosure will be described in detail through a specific example.

First, it is assumed that the service function chain of the request r received from the external network is Sr=<F1, F2, . . . , F6>.

And suppose that the calculation matrix M shown in formula (1) above can be obtained by counting the available VNF instances contained in each optical domain server in the optical domain data center. Then, the sequence of each row of the calculation matrix M is converted to a decimal value to obtain the vector V shown in the above formula (2).

Next, repeated attempts are made at the following steps to complete the server mapping:

(1) In order to record the results, a variable rec_len storing the maximum number of consecutive VNF instances and a variable rec_index storing its corresponding row index are initialized. These two variables should be array variables each with the length of t+1.

(2) First, from the minimum number of data transmissions t=0, the longest consecutive sequence of 1's may be found sequentially from the calculation matrix M in an order from right to left. In this example, because at t=0, it is not possible to find any server that guarantees that the number of data transfers is zero (i.e., the server has all VNF instances installed), the variable t is incremented by one to begin looking for a scheme with a number of data transfers of one (t=1).

(3) For a loop variable i from 1 to t+1, the maximum number of consecutive rows from the right in the calculation matrix M is looked up in turn. In particular, the number j of consecutive ones is set to be from $|F_n|$ to 1, and then each element of the vector V is ANDed with $2^j-1$. If the result after a certain element $v_m$ performs the above operation is $2^j-1$, it indicates that there is a sequence of consecutive j ones, and then the length of the consecutive ones and the corresponding row number are recorded, i.e. rec_len[i]=j, rec_index[i]=m, then shift the element in V bit by bit to the right by j bits, add 1 to i, and repeat the step; otherwise, j is decremented by 1 and the search continues.

In this example, the elements in V are first ANDed with $2^6-1=63$, and the result is shown in the following formula (4):

$$V \& 63 = \begin{bmatrix} 53 \& 63 \\ 56 \& 63 \\ 7 \& 63 \end{bmatrix} = \begin{bmatrix} 53 \\ 56 \\ 7 \end{bmatrix} \quad (4)$$

As can be seen, there is no expected result, so that j is subjected to a decrementing operation and is repeatedly executed until j=3 and $2^3-1=7$, and an operation result of the AND operation can be obtained as shown in the following formula (5):

$$V \& 63 = \begin{bmatrix} 53 \& 7 \\ 56 \& 7 \\ 7 \& 7 \end{bmatrix} = \begin{bmatrix} 5 \\ 0 \\ 7 \end{bmatrix} \quad (5)$$

As can be seen, v3 is the expected result and rec_len[1]=3 and rec_index[1]=3 are recorded.

Then, right-shifting the V matrix element by 3 bits to obtain the following formula (6):

$$V >> 3 = \begin{bmatrix} 53 >> 3 \\ 56 >> 3 \\ 7 >> 3 \end{bmatrix} = \begin{bmatrix} 6 \\ 7 \\ 0 \end{bmatrix} \quad (6)$$

Then, the above step (3) is repeated, and it is known that rec_len[2]=3, rec_index[2]=2.

(4) Summing the elements of rec_len and comparing the result with $|F_n|$, if the two values are equal, indicating that the optimal server sequence is found, returning the result and exiting the procedure, otherwise, adding 1 to t, and then jumping to step (2) to continue execution. If t has reached its upper limit $|F_n|-1$ and no available result has been found, it indicates that there is no VNF instance available in the network and jumps to step (5).

In this example, since the sum(rec_len) is 6, which equals to $|F_n|$, the result rec_index=[3,2] may be returned. As can be seen, the result returned is the server sequence.

(5) The server with the smallest remaining capacity and sufficient to install all required VNF instances is selected, and the relevant instance is installed in the server, which will be used to process user data.

As can be seen from the above flowchart, the server sequence returned by the above procedure can be regarded as an optimal scheme for implementing VNF instances in the service function chain, and frequent transfers of the user data among multiple racks can be avoided to a greater extent.

Figure 10:
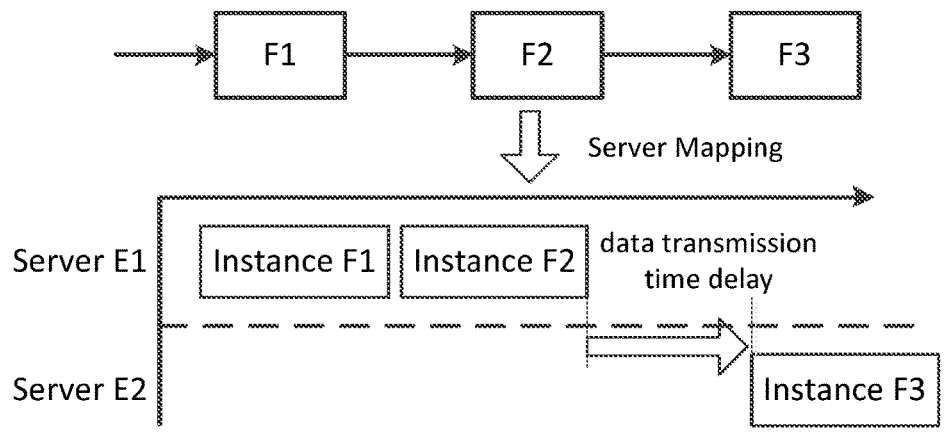
FIG. 10 is a flowchart illustrating a time planning process for implementing VNF instances of a service function chain request in accordance with an example of the disclosure.

Next, the process of determining the transmission path of the service function chain request using a time planning method according to some examples of the disclosure will be described in detail through a specific example. FIG. 10 shows an example of the time planning process for implementing VNF instances of a service function chain request.

As shown in FIG. 10, since VNF instances themselves have different data processing rates, different processing delays are introduced when processing a user request. After the processes of VNF instances selection and server mapping, the time planning needs to be carried out on the instances, thus the service function chain can be processed sequentially. As shown in FIG. 10, the service function chain request is firstly transmitted to the instance F1 in the server E1 by a data center inlet for processing. After the instance completes the processing, the data are transmitted to the instance F2 located in the same server for processing, and the time delay of the transmission process is small; after that, since the instance F3 is located in the server E2, wavelength exchanging would be performed between the racks, so that a certain data transmission time delay may be introduced, and the time delay is related to factors such as the size of the data and the optical path configuration time. As can be seen from FIG. 10, the data exchange delay between racks is significantly increased compared to the data exchange between servers within a rack.

In addition, because the instance F3 in the server E2 is selected, the NFV controller suspends its keep-alive timer, preventing the instance from being removed after $K_{F3}$.

Figure 11:
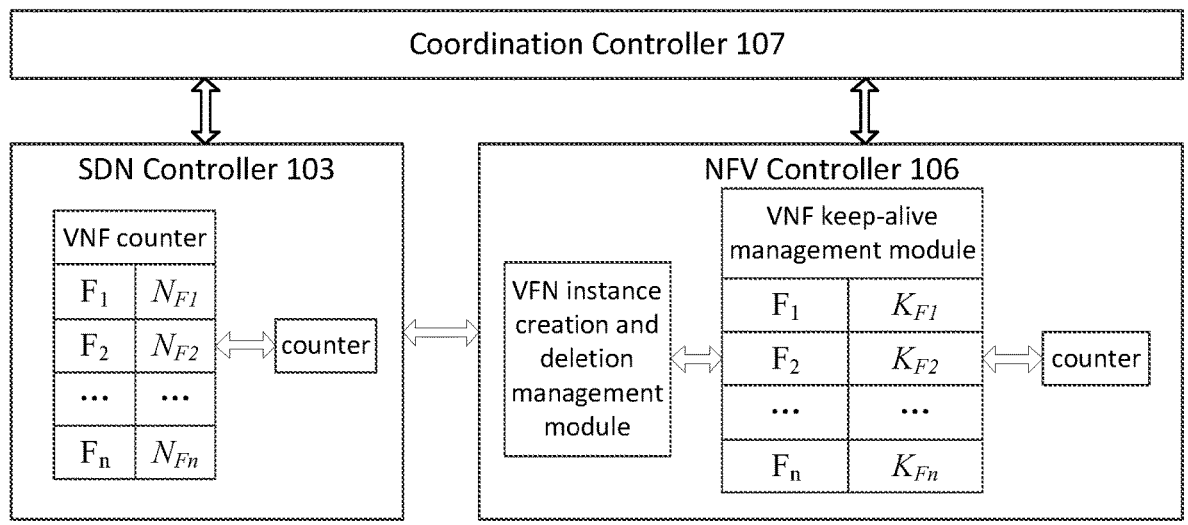
FIG. 11 shows modules used by a software defined network (SDN) 103 and an NFV controller 106 to detect the state of the user and adjust VNF deployment dynamically.

FIG. 11 shows the modules used by the SDN controller 103 and the NFV controller 106 to detect the state of the user and dynamically adjust VNFs. Where the VNF counter is located in the SDN controller 103, the SDN controller 103 may continuously monitor the user data, record which VNFs are being requested, and count $N_{Fn}$ by the VNF counter. The VNF counter can be reset by setting a corresponding time period so as to avoid the long-before state of the network affecting the existing strategy. Meanwhile, by settings the timer, the SDN controller 103 computes on the above formula (3) every fixed time period. If formula (3) is true, it indicates that the state of the network has changed and some VNFs have failed to meet the requirements, the SDN controller 103 then informs the VNF instance creation and deletion management module of the NFV controller 106 to increase the number of corresponding VNF instances so as to improve the processing capacity of the network. In the NFV controller 106, the VNF keep-alive management module is responsible for recording the keep-alive time $K_{Fn}$ of each VNF instance, and by setting the $K_{Fn}$ value and the corresponding timer, the VNF instance creation and deletion management module can delete a VNF after the user data has been processed for a period of time to release the computing resources occupied by the VNF. It should be noted that the value of $K_{Fn}$ may affect both the request processing efficiency and the computing resource occupancy in the network and it can be optimized by the controller according to relevant resource allocation policies.

One of ordinary skilled in the art will understand that: any of the above examples is merely exemplary and is not intended to imply that the scope of the disclosure, including the claims, is limited to these examples. The above examples or technical features in different examples can also be combined, the steps can be implemented in any order, and there can be many other variations of the examples described above, which are not provided in detail for the sake of brevity.

In addition, well-known power/ground connections to integrated circuit (IC) chips and other components may or may not be shown in the figures for simplicity of illustration and discussion. Furthermore, it will be apparent to those skilled in the art that the disclosure may be practiced with or without some specific details or with variations of these specific details. Accordingly, the description is to be regarded as illustrative in nature, and not as restrictive.

While the disclosure has been described in conjunction with specific examples thereof, many alternatives, modifications and variations thereof will be apparent to those skilled in the art in light of the foregoing description. For example, other memory architectures (e.g., dynamic RAM (DRAM)) may use the examples discussed.

The examples are intended to include all alternatives, modifications and variances that fall within the scope of the appended claims. Therefore, it is intended that any omissions, modifications, equivalents, improvements and the like should be included within the scope of the disclosure.

What is claimed is:

1. A method for processing a service function chain request, comprising:
   classifying the service function chain request received; wherein, the service function chain requested by the service function chain request comprises at least one virtual network function VNF;
   determining a domain to process the service function chain request; wherein, the domain comprises any one of an optical domain or an electrical domain;
   distributing the service function chain request to the domain determined;
   determining at least one server to implement the at least one VNF; and
   determining the time at which the at least one server processes the at least one VNF.

2. The method of claim 1, wherein classifying the service function chain request received comprises: classifying the service function chain request according to at least one of the rate of the service function chain request or a parameter of Service Level Agreement.

3. The method of claim 1, wherein determining at least one server to implement the at least one VNF comprises:
   acquiring VNF instances in an idle state on each server in the domain determined to obtain an idle instance set corresponding to the service function chain request;
   constructing a calculation matrix according to the idle instance set; wherein each row of the calculation matrix corresponds to each available server, each column corresponds to each VNF requested by the service function chain, and each element indicates whether the corresponding server contains the corresponding VNF instance; and
   selecting the at least one server from the available servers to implement the at least one VNF according to the calculation matrix to obtain a server sequence for implementing the service function chain with a minimum number of servers.

4. The method according to claim 3, wherein selecting the at least one server from the available servers to implement the at least one VNF comprises:

A, setting a data transmission frequency control variable t=0;
B, determining whether the data transmission frequency control variable t is less than or equal to $|F_n|-1$, if so, proceeding to C, otherwise, proceeding to P; wherein $|F_n|$ number of VNFs included in the service function chain;
C, setting a circulation variable i=1;
D, determining whether i is smaller than or equal to t+1, if so, proceeding to E, otherwise, proceeding to M;
E, setting the maximum number of consecutive VNFs instances located on the same server as $j=|F_n|$;
F, determining whether the variable j is greater than or equal to 1, and if so, proceeding to G; otherwise, returning to D;
G, performing an AND operation on each row of the calculation matrix and a comparison vector;
H, determining whether the result of the AND operation is equal to the comparison vector or not, and if so, proceeding to I; otherwise, proceeding to L;
I, recording the length of a longest VNF instance sequence as j and recording a corresponding row number, taking a cyclic variable i as an index;
J, carrying out a bit-by-bit shift operation on each row of the calculation matrix, and performing a zero padding on each row of the calculation matrix; wherein the number of shifted bits is j;
K, adding 1 on the loop variable i, setting $j=|F_n|-j$, and returning to F;
L, subtracting 1 from the variable j, and returning to F;
M, determining whether a VNF instance sequence is available, and if so, proceeding to N; otherwise, proceeding to O;
N, returning the server containing a serial number of the corresponding VNF instance and ending;
O, setting t=t+1, and returning to B; and
P, selecting a server with sufficient capacity to create all required VNF instances.

5. The method of claim 4, wherein, the length of the comparison vector is $|F_n|$, the last j bits of the comparison vector are 1, and the first $|F_n|-j$ bits of the comparison vector are 0; the bit-by-bit shift operation comprises a bit-by-bit right shift operation, and adding a j-bit zero sequence at the first j bits.

6. The method of claim 4, wherein, the length of the comparison vector is $|F_n|$, the first j bits of the comparison vector are 1, and the last $|F_n|-j$ bits of the comparison vector are 0; the bit-by-bit shift operation comprises a bit-by-bit left shift operation and adding a j-bit zero sequence at the last j bits.

7. The method according to claim 4, wherein selecting the at least one server from the available servers to implement the at least one VNF further comprises: converting each row of the calculation matrix into a decimal value to obtain a vector V; wherein,
   performing an AND operation on each row of the calculation matrix and a comparison vector comprises: performing an AND operation on each element of the vector V and $2^j-1$;
   determining whether the result of the AND operation is equal to the comparison vector or not comprises: determining whether the result of the AND operation is equal to $2^j-1$ or not; and
   carrying out a bit-by-bit shift operation on each row of the calculation matrix, and performing a zero padding on the other bits comprises: right shifting each element in the vector V by j bits and padding with j bits of zeros at the first j bits.

8. The method of claim 4, wherein determining whether a VNF instance sequence is available comprises: performing a summation operation on the length of the recorded longest VNF instance sequence, determining whether the summation result is equal to $|F_n|$, and if so, determining that the VNF instance sequence is available.

9. The method of claim 4, wherein selecting a server with sufficient capacity to create all required VNF instances comprises: selecting a server with sufficient capacity and minimal remaining capacity to create all required VNF instances.

10. The method of claim 1, wherein determining the time at which the at least one server processes the at least one VNF comprises:
determining the processing delay of the at least one VNF according to the size of the data to be processed and the data processing rate of each VNF;
determining the data transmission delay between each two servers according to the length of a pre-configured transmission path and the exchange rate of the servers; and
determining the time at which the at least one server processes the at least one VNF according to the processing delay and the transmission delay.

11. The method of claim 1, further comprising:
counting VNFs contained in service function chains requested by service function chain requests received within a preset time period;
recording requested frequency of each VNF;
checking whether the requested frequency of each VNF matches the distribution of each VNF in the system; and
if the requested frequency of a VNF does not match the distribution of the VNF in the system, deploying the VNF instance in a server.

12. The method of claim 11, wherein checking whether the requested frequency of each VNF matches the distribution of each VNF in the system comprises:
determining the ratio of the number of instances of each VNF in the system and the number of all VNF instances in the system as the distribution of each VNF in the system; and
checking whether the requested frequency of each VNF matches the distribution of the VNF in the system by judging whether the following formula is established:

$$\frac{I_{F_n}}{\sum_{F_k \in T} I_{F_k}} < \frac{C_{F_n}}{\sum_{F_k \in T} C_{F_k}}$$

wherein, T represents the set of instances of all VNFs in the system; $C_{F_n}$ represents the number of times VNF instance $F_n$ is requested; $I_{F_n}$ represents the number of VNF instances $F_n$ in the current system;
if the formula is established for a certain VNF, determining the requested frequency of the VNF does not match the distribution of the VNF in the system.

13. The method of claim 12, wherein deploying the VNF instance in a server comprises: selecting a server that contains the least VNF instances and deploying the VNF instance in the server selected.

14. The method of claim 1, further comprising:
presetting a keep-alive time for each VNF instance in the system;
after a VNF instance processes a service function chain request, setting the VNF instance in an idle state; wherein the maintenance time of the idle state is set as the keep-alive time corresponding to the VNF instance; and
if the idle state of a VNF instance ends without the arrival of a new request, removing the VNF instance from the server.

15. The method of claim 1, further comprising:
after determining the time at which the at least one server processes the at least one VNF, configuring the time and the corresponding VNF to be processed to the corresponding server of the at least one server; and
processing by each server the corresponding VNF at the time configured.

16. A system for processing a service function chain request, comprising:
a request discriminator, configured to classify a service function chain request received, and determine a domain to process the service function chain request; wherein the service function chain requested by the service function chain request comprises at least one virtual network function VNF; and the domain comprises any one of an optical domain or an electrical domain;
a reconfigurable optical add-drop multiplexer ROADM, configured to distribute the service function chain request to the domain determined according to the classification result of the request discriminator;
a software definition network controller, configured to control the request discriminator and set classification rules to the request discriminator and configure the ROADM;
an optical domain data center connected to the ROADM, wherein the optical domain data center comprises at least one VNF;
an electrical domain data center connected to the ROADM, wherein the electrical domain data center comprises at least one VNF; and
a network function virtualization controller, configured to monitor and maintain the operation state of the at least one VNF in the optical domain data center and the electric domain data center and adjust the deployment of the at least one VNF.

17. The system of claim 16, wherein the optical domain data center comprises:
at least one wavelength selective switch WSS; and
at least one optical domain server connected to the at least one WSS; wherein, the at least one optical domain server comprises at least one VNF; the at least one WSS is used for performing wavelength exchange between the at least one optical domain server and the ROADM.

18. The system of claim 16, wherein the electric domain data center comprises:
at least one electric domain server; and
a switch for connecting the at least one electric domain server and the ROADM;
wherein, the at least one electric domain server comprises at least one VNF.

19. The system of claim 16, further comprising:
a coordination controller; and
an Operation Support System/Business Support System OSS/BSS, configured to perform policy distribution and parameter setting on the network function virtualization controller and the software definition network controller through an API and the coordination controller.

* * * * *